(12) United States Patent
James

(10) Patent No.: US 11,818,433 B2
(45) Date of Patent: Nov. 14, 2023

(54) SYSTEM FOR THE REPRODUCTION OF A MULTIMEDIA CONTENT USING AN ALTERNATIVE NETWORK IF POOR QUALITY IN FIRST NETWORK

(71) Applicant: NAXOS FINANCE SA, Luxembouorg (LU)

(72) Inventor: Robert James, Hatfield (GB)

(73) Assignee: Naxos Finance SA, Luxembourg (LU)

( * ) Notice: Subject to any disclaimer, the term of this patent is extended or adjusted under 35 U.S.C. 154(b) by 64 days.

(21) Appl. No.: 17/761,502

(22) PCT Filed: Sep. 19, 2019

(86) PCT No.: PCT/IB2019/057913
§ 371 (c)(1),
(2) Date: Mar. 17, 2022

(87) PCT Pub. No.: WO2021/053375
PCT Pub. Date: Mar. 25, 2021

(65) Prior Publication Data
US 2022/0377422 A1 Nov. 24, 2022

(51) Int. Cl.
*H04N 21/462* (2011.01)
*H04N 21/414* (2011.01)
*H04N 7/173* (2011.01)

(52) U.S. Cl.
CPC ..... *H04N 21/4622* (2013.01); *H04N 7/17318* (2013.01); *H04N 21/41407* (2013.01)

(58) Field of Classification Search
CPC ....... H04N 21/41407; H04N 21/41422; H04N 21/6131; H04N 21/4524
See application file for complete search history.

(56) References Cited

U.S. PATENT DOCUMENTS

2005/0075783 A1* 4/2005 Wolf .................. G06F 16/9577
  342/357.31
2005/0120208 A1* 6/2005 Albert Dobson ....... H04L 43/00
  713/160

(Continued)

FOREIGN PATENT DOCUMENTS

WO      2016/074693 A1    5/2016

OTHER PUBLICATIONS

International Search Report and Written Opinion dated May 19, 2020, issued in PCT Application No. PCT/IB2019/057913, filed Sep. 19, 2019.

*Primary Examiner* — Jason Salce
(74) *Attorney, Agent, or Firm* — Workman Nydegger

(57) ABSTRACT

A method, an apparatus and a system for the reproduction of a specific multimedia content are provided. The method includes the step of acquiring one or more samples of a specific multimedia content reproduced by a mobile multimedia radio/television apparatus, where the specific multimedia content is included in a first signal emitted by a broadcast-type radio/television network, including the further step of determining an identifier of the specific multimedia content and the value of a quality parameter of the first signal. According to the value of the quality parameter of the first signal, further steps include receiving on a multimedia telephone apparatus the specific multimedia content through a second signal emitted by a cellular telephone network, sending the specific multimedia content to one or more multimedia reproduction units included in the mobile multimedia radio/television apparatus.

6 Claims, 2 Drawing Sheets

(56) References Cited

U.S. PATENT DOCUMENTS

| | | | |
|---|---|---|---|
| 2005/0153650 A1 | 7/2005 | Hikomoto | |
| 2010/0105377 A1* | 4/2010 | Iwamura | H04W 36/305 |
| | | | 455/67.11 |
| 2015/0098584 A1 | 4/2015 | Emani et al. | |
| 2015/0304874 A1* | 10/2015 | Oldewurtel | H04W 28/26 |
| | | | 370/252 |
| 2015/0312301 A1* | 10/2015 | Dasher | H04L 1/0014 |
| | | | 709/217 |
| 2016/0065995 A1* | 3/2016 | Phillips | H04N 21/25841 |
| | | | 725/62 |
| 2016/0157209 A1 | 6/2016 | Baldwin | |
| 2016/0314794 A1 | 10/2016 | Leitman et al. | |
| 2017/0010853 A1* | 1/2017 | Gelles | G06F 3/165 |
| 2018/0343488 A1* | 11/2018 | Amento | H04L 65/1069 |
| 2019/0238244 A1 | 8/2019 | Thramann et al. | |

\* cited by examiner

SYSTEM FOR THE REPRODUCTION OF A MULTIMEDIA CONTENT USING AN ALTERNATIVE NETWORK IF POOR QUALITY IN FIRST NETWORK

BACKGROUND OF THE INVENTION

1. The Field of the Invention

The present invention relates to a system for the reproduction of a specific multimedia content, according to claim 1. In particular, the system for the reproduction of a specific multimedia content of this invention is in the field of radio and television broadcasting, where audio and/or video multimedia contents are transmitted and received based on international standards.

2. The Relevant Technology

In the context of the present description, radio and television services are intended as those services that are commonly referred to as radio or television. According to the state of the art in the field of radio and television broadcasts, these services, both analog and digital, are provided through one or more unidirectional broadcast networks (that is, from a single radio/television telecommunications network towards a plurality of receivers, of both the radio and television type) with high-power transmitters and antennas placed on high towers (i.e., High-Power, High-Tower); typically, each transmitter emits a radio signal adapted to provide one or more radio/television services over a predetermined coverage area. The power of the radio signal emitted by a radio/television transmitter must be high enough to guarantee continuity of service within the predetermined coverage area. However, within the individual coverage areas or between adjacent coverage areas, there are areas, also called "shadow areas", where the radio/television service is interrupted, when one is moving, due to too much distance from the transmitters or due to the presence of natural obstacles (for example hills, mountains, woods, etc.) or artificial obstacles (for example, buildings, tunnels, etc.).

In addition, a transition area is usually placed between the coverage areas and the shaded areas, where in a situation of movement the radio/television service presents disturbances and interruptions of varying duration. According to techniques known to the state of the art, to avoid service interruptions while in movement, for example when travelling by car or train, during the transition of a mobile receiver from a coverage area of a transmitter to the coverage area of the adjacent transmitter, such adjacent coverage areas are usually partially overlapped; in particular, radio standards allow transmitting "metadata" (that is, additional data containing information on alternative frequencies on which to receive a specific radio service, for example the RDS system or Service Information in DAB) that help car radios carry out so-called "service following", that is, maintaining continuity in listening to the service selected by the user in the passage between service areas covered by different transmitters.

More generally, in the course of the present description, the term "service following" will be used to indicate a method capable of maintaining the continuity in listening to the service selected by the user even within the shadow areas of the radio/television network. Usually, an audio and/or video service, defined in the course of the present description as multimedia content, is provided in a redundant manner by a plurality of superimposed television or radio networks; for example, a multimedia content can be provided either by means of an analog network (for example, FM frequency modulation or AM amplitude modulation) or by means of a digital radio/television network (for example, according to DVB-T or DVB-T2, _DAB, DAB+ or DRM standards). These radio/television networks are often characterised by different territorial coverage and the "coverage areas", shadow areas and transition areas do not coincide. To obtain the maximum continuity of the radio/television service in a situation of movement, the radio receivers (for example car radios) are usually configured to receive a plurality of radio signals, both analog and digital, and provide "service following" mechanisms with automatic switching between the various signals; these "service following" mechanisms are made possible by the information contained in the metadata transmitted along with the radio signals, which make it possible to identify and follow the radio service selected by the user in the various networks and technologies. Although the "service following" mechanisms that exclusively exploit the digital and analog radio signal are able to minimise radio service interruptions, the problems related to the total absence of radio signal, both analog and digital, do not allow completely eliminating the problem. The same is true when wanting to allow the other passengers in a vehicle to watch video/television programs in a situation of movement, placing the monitor in the rear area for passengers, thereby avoiding distracting the driver.

SUMMARY OF THE INVENTION

The main object of the present invention is to overcome the lack of the radio/television signal in the shadow areas of the broadcasting network; in particular, the present invention relies on the widespread diffusion of broadband mobile radio telecommunications networks (for example, mobile radio telecommunications networks according to 3GPP standards such as, for example, UMTS (W-CDMA), CDMA 2000, TD-SCDMA, LTE, a-LTE, and 5G). Although the coverage of these mobile radio telecommunications networks in turn has transitional areas and shadow areas, the sum of the areas covered by the radio/television services and those covered by the mobile radio services allows a significant increase in the geographical continuity of the available signal. For example, many motorway tunnels are covered by mobile radio telecommunications networks using slotted cables, but they are not covered by radio/television telecommunications networks (for example, DVB-T, DVB-T2 DAB, DAB+, FM, etc.). Mobile radio telecommunications networks can operate both in unicast mode (that is, with bi-directional one-to-one connections with each connected user), and in multicast mode (that is, with "downlink-only" connections from one to many, according to the MBMS, eMBMS and feM-BMS standards); according to one aspect of the present invention, the mobile radio telecommunications networks can complement the coverage of broadcast networks, for example a DAB network in "shadow areas", in order to avoid interruptions in the reproduction of a multimedia content (for example, a radio program) in a situation of movement.

International patent application number WO2016/074693A1 describes a method and a combined apparatus (therefore equipped with a radio receiver and a telephone receiver) for means in movement (such as motor vehicles) capable of receiving radio services transmitted both on broadcast networks and on mobile radio networks. If the reception of the same in a motor vehicle is not satisfactory, this apparatus is able to automatically switch over to the mobile radio network when, using the receiver's geographical position, it is estimated that the broadcast service will become unusable moving in a certain direction.

Patent application US 2005/0153650 describes a combined mobile terminal which comprises means for receiving audio/video signals from radio telecommunications networks and mobile radio telecommunications networks, respectively. The invention describes the operation of the terminal, which can switch between broadcast reception and mobile radio reception based on the current quality of reception of the audio and/or video signal. The terminal described in the patent application requires that the radio reception apparatus first store and then communicate to an Integrated Services Centre which program the user was using at the moment when the quality of the mobile radio reception was deteriorating.

The systems for the reproduction of a multimedia content described and known to the state of the art are therefore characterised by the use of an apparatus for multimedia reproduction which contains means capable of communicating with a first telecommunications network (for example, a radio telecommunications network) as well as other means capable of communicating with a second telecommunications network (for example, a mobile radio telecommunications network); moreover the techniques known to the state of the art require the use of a terminal, such as for example the infotainment apparatus of a car, which needs to possess a certain amount of information such as, for example, the geographical position of the multimedia reproducer, the coverage map of the radio and mobile radio networks, the quality and delay of the radio network and mobile radio network signals, and the indication of the program selected by the listener. These requirements exclude the application of the methods and systems known to the state of the art on multimedia reproduction devices in a state of movement which are unable to have all the information listed above on board; for example, a simple multimedia reproduction apparatus installed on a motor vehicle (that is, a car radio), in particular if it lacks a module for accessing the mobile radio telecommunications network, would not be able to have all the information listed above on board; moreover, such an apparatus (that is to say, a car radio) would not in any case be able to receive the multimedia content from the mobile radio network as it is incapable of communicating with the mobile radio network itself. These requirements have limited the use of the known state of the art "service following" features since the infotainment systems installed, for example on vehicles, usually lack modules for communication via the mobile radio network.

A further object of the present invention is therefore to indicate a method, an apparatus, and a system for the reproduction of a specific multimedia content capable of overcoming the limitations of the techniques known to the state of the art. In particular, an object of the present invention is to improve the usability of a multimedia service while in movement, through the use of multimedia devices of normal construction installed on mobile means. A further object of the present invention is to indicate a method for realising a service following service for an infotainment system installed in a vehicle that does not require practically any modification of the infotainment system itself.

The method and/or system for the reproduction of a specific multimedia content of the present invention therefore comprises a step for configuring a first multimedia apparatus for receiving a first signal transmitted by a first telecommunications network, where said first signal comprises said specific multimedia content. The first multimedia apparatus can be for example a module for receiving and extracting a multimedia content transmitted via an analog or digital radio/television network (for example, DVB-T, DVB-T2, DAB, DAB+, or DRM); for example, said first multimedia apparatus can be a car radio comprised in an infotainment system of a motor vehicle. Alternatively, said first multimedia apparatus can be an apparatus for reproducing audiovisual material such as, for example, a portable television or a laptop.

The step of configuring the first multimedia apparatus can comprise tuning a receiver, comprised in said multimedia apparatus (for example an analog or digital radio receiver) to the frequencies of a specific multimedia service chosen by the user. Said first signal can be, for example, the radio signal transmitted by an analog or digital radio telecommunications network; alternatively, said first signal can be the television signal of an analog or digital television telecommunications network. This specific multimedia content can be, for example, a radio program, a piece of music, visual content, a television program, etc. Said first telecommunications network can be, for example, an analog, digital, or broadcast radio network, or an analog or digital television network, or, more generally, a unidirectional broadcast telecommunications network.

The method and/or system of the present invention further comprises the step of determining, by means of a dedicated measuring device, the value of a quality parameter of the first signal. Said quality parameter can be, for example, the power of the received signal, or the signal to noise ratio (SNR) or, alternatively, any parameter indicative of the quality of the signal in terms of its ability to reproduce the information contained in the signal received in the same receiver. Said quality parameter can be determined indirectly by said device, for example by estimating the value of the quality of the multimedia content as it is reproduced. For example, in the case of a multimedia content transmitted via a radio telecommunications network, the audio reproduction of the radio content can be acquired by a microphone outside the aforementioned first multimedia player; the value of the quality parameter of the first signal can therefore be indirectly deduced from the quality of the reproduced audio. This also applies to television transmissions, as they are also equipped with an audio section. For example, in the case in which the audio of the multimedia content extracted from the first signal is reproduced by the first multimedia apparatus with frequent interruptions, or long silences, or with background signals identifiable as noise, it is possible to deduce that the quality of the first signal does not guarantee a reproduction of the multimedia content of sufficient quality; in this case the value of the quality parameter of the received signal can be deduced from the value of the quality parameter of the reproduction of the multimedia content.

More generally, the quality parameter of the first signal is an indicator of the ability of the first multimedia apparatus to reproduce the multimedia content comprised in the first signal. In general, it is therefore possible to determine a range of values of the quality parameter of the first signal within which the reproduction of the multimedia content cannot be guaranteed. If the quality of the first signal does not guarantee the correct reproduction of the selected multimedia content, the method and/or system of the present invention comprises the step of receiving a replacement signal, comprising the same specific multimedia content received from the first multimedia apparatus, through a second signal received from a second multimedia apparatus connected to a second telecommunications network, where said second signal carries the same contents as the previously received network. The second multimedia apparatus can be comprised, for example, in a mobile phone or in a mobile multimedia processor (i.e., a smartphone).

The second telecommunications network can be, for example, a mobile radio network (for example, UMTS (W-CDMA), CDMA 2000, TD-SCDMA, LTE, a-LTE, and 5G) or a local data network (for example, WiFi 802.11). Therefore, an important aspect of the present invention when the first apparatus is not able to reproduce the multimedia content satisfactorily, lies in the fact that a second external multimedia apparatus is configured to receive said second signal from said second telecommunications network comprising the same multimedia content previously selected and received by the user through said first multimedia apparatus.

The method and/or system of the present invention further comprises the step of extracting the specific multimedia content from the second signal by means of the second multimedia apparatus. For example, if the second multimedia apparatus is included in a smartphone outside the first multimedia apparatus, the specific multimedia content desired can be decoded or extracted from a data streaming transmitted by the mobile radio network. Finally, said multimedia content can be reproduced through multimedia reproduction means such as for example speakers or, in the case of a visual content, by a monitor. In particular, said multimedia reproduction means can be for example the speakers of an infotainment system installed in a vehicle connected to said second multimedia apparatus through a cable or with a wireless system. The second multimedia apparatus, which can be comprised for example in a smartphone, which after receiving the second signal and extracting the specific multimedia content desired, can use the speakers of the vehicle's infotainment system to reproduce said multimedia content, for example through the Bluetooth system or via the charging cable of the smartphone.

To reach the aims indicated above, the object of the present invention is therefore a method, an apparatus, a system, and a computer program for the reproduction of a specific multimedia content incorporating the features of the appended claims, which form an integral part of the present description.

BRIEF DESCRIPTION OF THE DRAWINGS

Further objects, characteristics and advantages of the present invention will become clear from the following detailed description and the appended figures, provided solely by way of non-limiting example, wherein.

DETAILED DESCRIPTION OF THE PREFERRED EMBODIMENTS

Figure 1:
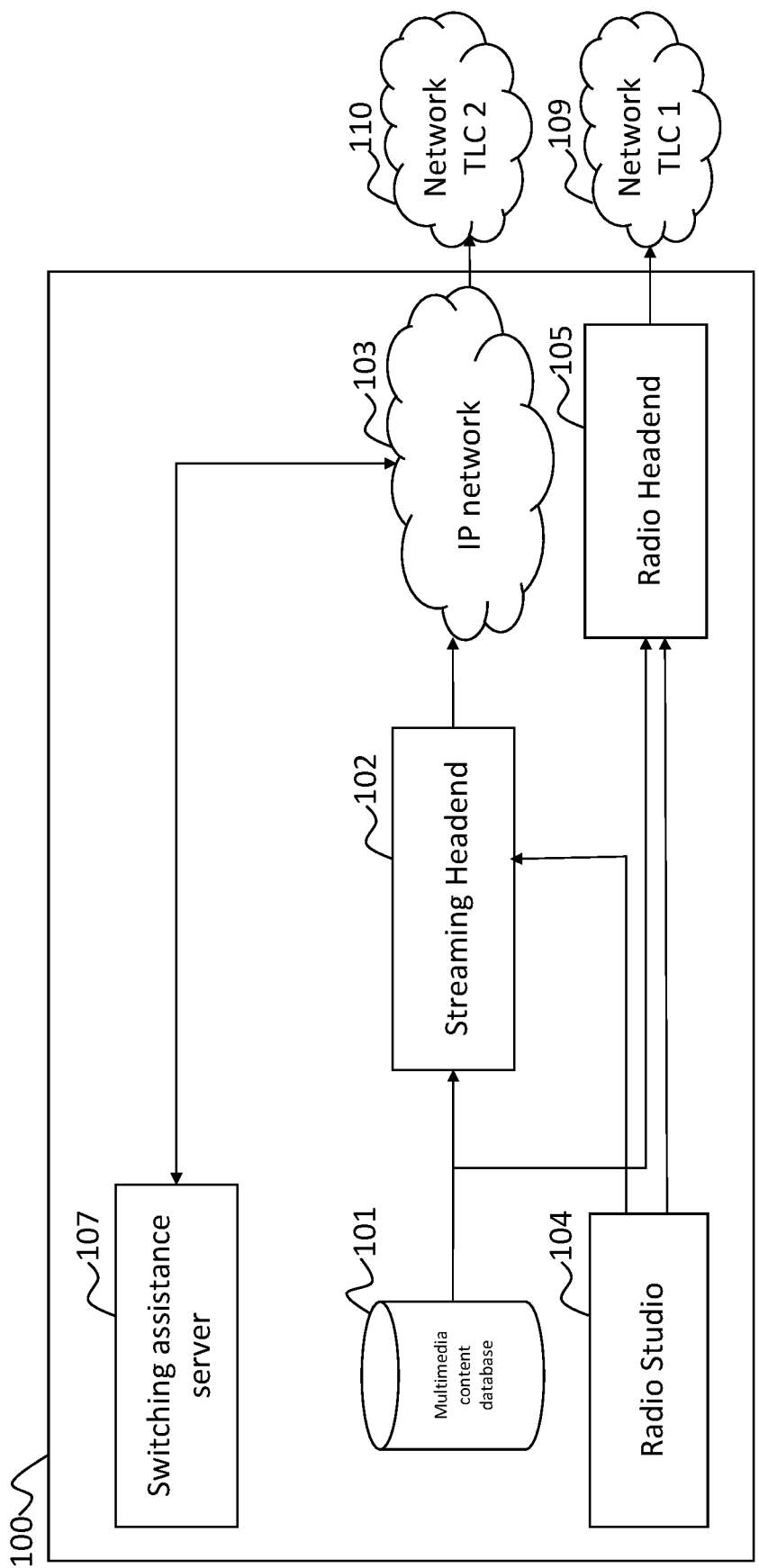
FIG. 1 schematically shows an integrated services centre for the production, storage and transmission of multimedia contents on broadcast networks and IP data networks.

Turning to the description of the appended figures, in FIG. 1 the reference number 100 is used to indicate an integrated services centre 100 as a whole for the production, storage and transmission of multimedia contents; in the course of the present description, the term multimedia content will be used to generically indicate an element of audiovisual information. For example, a multimedia content can be a radio program exclusively comprising an element of audio information; alternatively, a multimedia content can be a television program comprising an element of audiovisual information; in addition, a multimedia content can further comprise an element of textual information.

Merely by way of example and without limiting the scope of the invention in question, in the course of the present description reference will be made to an integrated services centre 100 for the production, storage and transmission of radio-type multimedia contents. In particular, the module 104 indicates a radio studio for the creation of radio programs transmitted, either via a broadcast radio network 109 (for example, a DAB, DAB+ radio network), or via a TCP/IP data network 110 (for example, a mobile radio data network that supports internet services). According to techniques known to the state of the art, in order to allow the broadcasting of the radio program through the broadcast radio network 109, the integrated services centre 100 comprises the module 105, called Radio Headend, configured to appropriately encode the radio program and insert it, with the optional addition of metadata, in a first radio signal compatible with the broadcast radio network 109. In parallel, the radio program is appropriately encoded by the module 102, called Streaming Headend, and inserted into a second signal compatible with the TCP/IP data network (103). Alternatively, a radio program created in the radio studio 104 can be stored on a database of multimedia contents 101 and broadcast live or deferred, on each of the two telecommunications networks 109 and 110.

The module 107 (optional), called the switching assistance server, is configured to support, from the computational and program identification point of view, the operations carried out for the realisation during the broadcasting step and subsequently in the reception step of the "service following" service.

Figure 2:
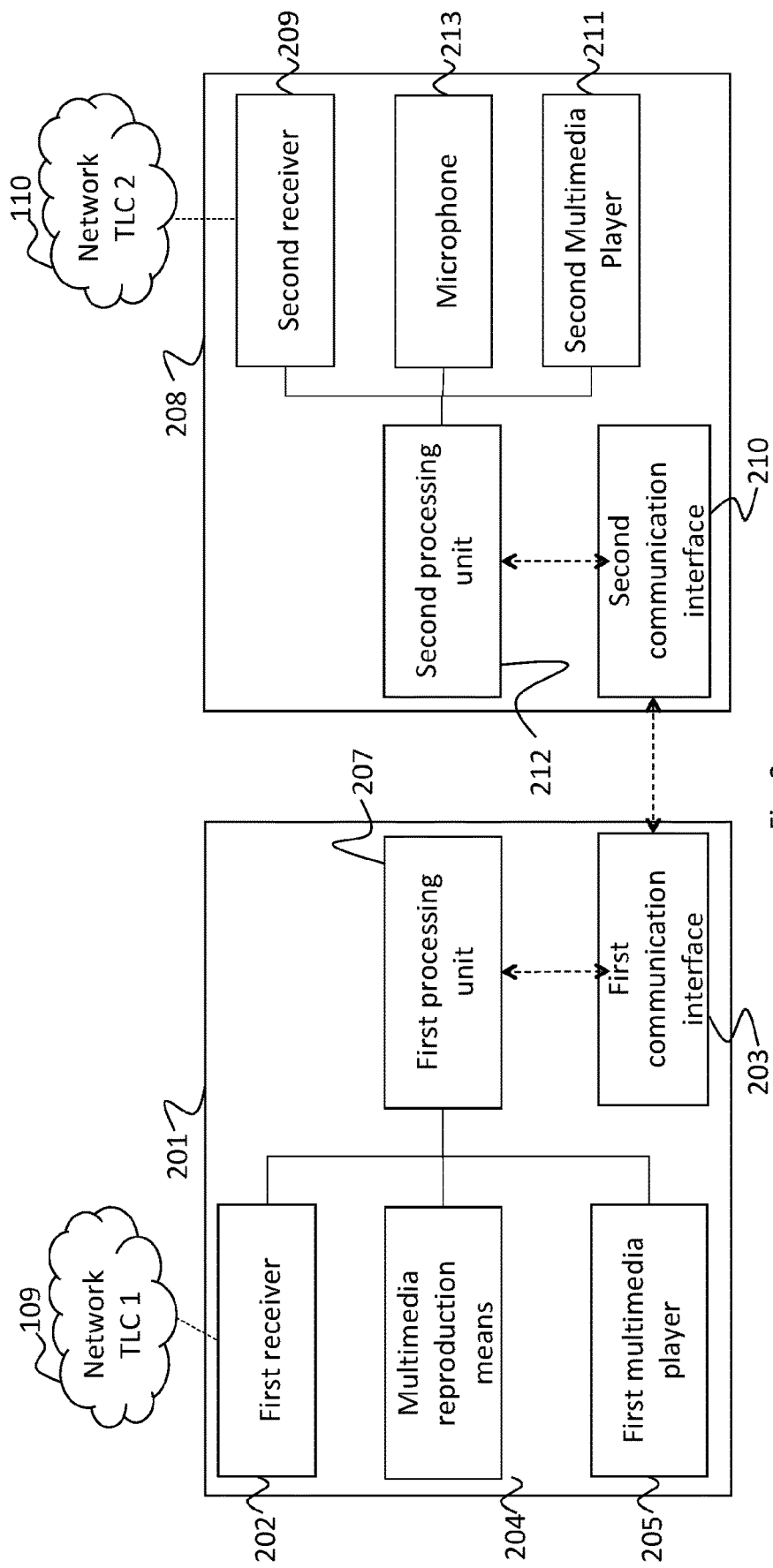
FIG. 2 schematically shows an embodiment of the present invention comprising an infotainment system and a cellular phone of the smartphone type.

FIG. 2 indicates an embodiment of the present invention comprising an infotainment system 201 installed on a mobile means, for example a motor vehicle (also defined in the course of the present description as the first multimedia apparatus) and a cellular telephone, outside the infotainment system 201, of the smartphone type 208 (also defined in the course of the present description as a second multimedia apparatus or, more simply, as a cellular phone 208).

The infotainment system 201 comprises a first receiver 202 configured to receive, on the basis of the choice of the program made by the user, a first radio/television signal transmitted by the broadcast radio/television network 109 (also defined as the first telecommunications network in the course of the present description); said receiver 202 is further configured to supply, by means of a data bus, said first radio/television signal (or part thereof) to a first multimedia reader 205 (for example part of a car radio) which can be integrated into the infotainment system 201 of the motor vehicle. In general, the first multimedia reader 205 is able to extract/decode the specific radio or television program chosen by the first radio/television signal received by the broadcast radio/television network 109. The infotainment system 201 further comprises multimedia reproduction means 204. Said multimedia reproduction means 204 are configured to receive, in the form of an electric signal, the specific radio/television program extracted and/or decoded by the multimedia player 205 and make the radio/television program available to the user. For example, the multimedia reproduction means 204 can be speakers installed in the motor vehicle capable of converting an electric signal comprising the radio contents into sound waves that can be directly heard by the user. Alternatively, in the more general case wherein the multimedia content comprises a television content, the multimedia reproduction means 204 can comprise a device for displaying images, video, and text (for example, a monitor installed on a motor vehicle at the position of the passengers). The infotainment system 201 further comprises a communication interface 203, such as, for example, a USB input port or, alternatively, a module for short-range wireless communication, such as, for example, a Bluetooth or WiFi module; according to the present invention, said first communication interface 203 is configured to exchange data, in particular to receive, from the cellular phone 208, the multimedia contents relating to the radio program selected by the user if the first radio/television signal does not guarantee the correct reproduction of the radio program. Finally, the infotainment system 201 comprises a first processing unit 207 operatively coupled, via the data bus, with the first receiver 202, with the media reproduction means 204, with the first multimedia player 205, and with the first communication interface 203. Said processing unit 207 can be, for example, a digital processor (containing one or more CPUs) capable of decoding and executing instructions coded in a computer program (for example, a software application).

The cellular phone 208 outside the infotainment system 201 (also defined in the course of the present description as a second multimedia apparatus) comprises a second receiver 209 adapted to receive a second signal from a cellular mobile radio network 110 which supports internet services (also defined as a second telecommunications network in the course of the present description) in unicast or multicast mode (for example MBMS, e-MBMS, fe-MBMS); the cellular phone 208 also comprises a multimedia, audio and/or video decoder, or a second multimedia player 211, and a second electronic processing unit 212 capable of executing instructions encoded in a computer program (also defined as applications or, more simply, apps). The cellular phone 208 further comprises a second communication interface 210 configured to interconnect with the first communication interface 203 of the infotainment system 201; said second communication interface 210 can be, for example, a USB output port or alternatively, a module for short-range wireless communication such as, for example, a Bluetooth or WiFi module. The components of the cellular phone 208 are connected to each other via a data bus.

The telephone 208 and the infotainment system 201 can therefore establish a short-distance radio connection of the Bluetooth or WiFi type or a wired USB connection. The telephone 208 also comprises means capable of receiving, from said first multimedia apparatus (201), the multimedia content forming part of said first radio/television signal broadcast by the broadcast radio/television network 109. In a first implementation of the invention, said means capable of receiving a specific multimedia content can be realised through a microphone 213 capable of converting an environmental sound wave (also defined as an environmental acoustic signal in the course of the present description) into an electric signal (digital or analog); for example, the microphone 213 can be used to acquire the environmental acoustic signal emitted by the multimedia reproduction means 204 of the infotainment system 201. In this way, during the reproduction of a radio or television program, more generally, of a multimedia content by means of the infotainment system 201, the microphone 213 can acquire an environmental sound sample containing a sound reproduction of at least a part of said radio program.

According to one aspect of the present invention, the telephone 208 on which a specific application is loaded is configured to perform the "service following" function for a radio/television program selected by the user and reproduced by the infotainment system 201. In particular, the purpose of the "service following" function carried out by the telephone 208 is to improve the reproduction continuity of the radio/television program even in areas where the radio/television signal emitted by the broadcast radio/television network 109 does not guarantee a satisfactory reproduction of said radio/television program. In this regard, the telephone 208 is configured to acquire through the microphone 213 an environmental sound sample containing a sound reproduction of the specific radio/television program reproduced by the infotainment system 201; on the basis of said environmental sound sample, the second processing unit 212 is configured to determine an identifier of the radio/television program reproduced by the infotainment system 201 (for example, the name or a unique numerical identification of the radio/television program) and to estimate the quality of the reproduction (for example, indirectly determining the quality of the first radio/television signal). Alternatively or additionally, the telephone 208 can be configured to receive a copy of the radio/television signal received by the infotainment system 201 via the broadcast network 109. To this end, the first processing unit 207 of the infotainment system 201 can therefore be configured to create a copy of the radio/television signal received through the broadcast network 109 and to forward said copy of the radio/television signal to the telephone 208 through the first communication interface 203. On the basis of said copy of the radio/television signal received through the second communication interface 210, the second processing unit 212 is configured to determine an identification of the radio/television program reproduced by the infotainment system 201 (for example, through the metadata contained in the copy of the signal) and to estimate the quality value of the first radio/television signal. In the case wherein the reproduction of the radio/television program performed by the infotainment system 201 does not guarantee a predetermined satisfactory quality, the telephone 208 is configured to receive, via the second telecommunications network 110 (for example, the mobile radio network), a second replacement signal containing the same radio/television program. The second signal can be a data streaming transmitted according to the TCP/IP protocol through the mobile data network 110.

In order to implement the "service following" service in support of the infotainment system 201, the cellular phone 208 is configured to reconstruct, autonomously or with the support of one or more external devices (for example, the switching assistance server 107) one or more among the following information:

1) quality and/or delay of the first radio/television signal;
2) identification of the radio/television program selected by the user on the infotainment apparatus 201 and availability of the radio/television program in the database of multimedia contents 101 of the integrated services centre 100.

In general, as regards the realisation of the function described in point 2), an acoustic digital fingerprint is created, based on the sample obtained by performing a sampling on the environmental sound signal coming from the microphone 213, and compared with a central database 101 to search for the similarity of the sample. Alternatively or in addition, in the case wherein the telephone 208 has a copy of the radio/television signal received from the infotainment system 201 available, the identification of the specific radio/television program can be performed on the basis of a plurality of samples extracted directly from the copy of the radio/television signal.

More particularly, the telephone 208 is also configured to reconstruct the information (1) and (2) through the following functions:
- acquisition of the environmental acoustic signal and calculation of a hash;
- identification of the radio/television program via hash;
- estimate of the delay;
- switching management.

To carry out the "environmental acoustic signal acquisition" function, the telephone 208 is configured to periodically acquire, via the microphone 213, the sound signal emitted by the multimedia reproduction means 204 of the infotainment system 201 and to reconvert said sound signal into a digital format via sampling. This sampling operation comprises the creation of a plurality of samples originating from the subdivision of the sound signal into time intervals of fixed duration.

The telephone 208 is further configured to calculate one or more hash values (also defined, more simply, as hash in the course of the present description), starting from said plurality of samples of the radio/television program. The calculation of the hash value is a technique which, starting from a sequence of bits, applies a calculation algorithm to it (that is, the hashing function) and obtains a number which can be represented on a sequence of bits of fixed length, basically unique in reference to the original sequence. In this way, it is possible to associate a digital fingerprint to a multimedia content, or a bit sequence, which uniquely identifies this multimedia content. The calculation of the hash value is therefore functional to the identification of the radio/television program.

The "identification of a specific radio/television program via hash" function can be conveniently performed by the switching assistance server 107 in the following way:
- analysing a plurality of live and/or stored radio/television programs in the multimedia content database 101 and decoding/encoding the audio portion of said radio/television programs in sampled digital audio signals;
- calculating a plurality of hashes relating to these audio parts of said radio/television programs;
- receiving from the cellular phone 208 a hash relating to the radio/television program reproduced by the infotainment system 201;
- comparing the hash value of the radio/television program reproduced by the infotainment system 201 with the hash values of the audio parts of said live radio/television programs and/or stored in the database of multimedia contents 101;

In the case wherein the hash value of the radio/television program reproduced by the infotainment system 201 coincides, at least in part, with the hash value of at least one specific radio/television program contained in the database 101, the switching assistance server 107 is configured to obtain the identification of this specific radio and television program and to send this identifier to the phone 208. In addition, the switching assistance server 107 can send the telephone 208 the IP address of the streaming server 102 which supplies said radio/television program.

In the case wherein the hash value of the radio/television program reproduced by the infotainment system 201 does not coincide with any of the hash values of the radio/television programs contained in the database 101, the switching assistance server 107 is configured to send the telephone 108 an error message.

The "determination of the quality parameter of the first signal" function can be performed independently by the telephone 108 or, alternatively, with the support of the switching assistance server 107. In the first case, the telephone 208 can directly calculate this parameter (for example, the signal-to-noise ratio) by means of a copy of the radio/television signal received from the infotainment system 201 or through the sound sample acquired by the microphone 213. Alternatively, the switching assistance server 107 can estimate the quality parameter during the operations of "identification of the radio/television program via hash" described above. For example, when the identification of the specific television program fails (that is, if no match is found among the hash values), it can be deduced that the quality of the radio/television signal received by the infotainment system 201 is not such as to guarantee a correct reproduction of the radio/television content. On the contrary, when the identification of the specific television program is successfully completed (that is, if a correspondence is found among the hash values), it can be deduced that the quality of the radio/television signal received by the infotainment system 201 is such as to guarantee a correct reproduction of the specific radio/television content. In both cases, the server 107 can send the telephone 108 a message containing an estimate of the value of the quality parameter.

The purpose of the "estimate of the delay" function is to estimate, dynamically, the delay between the radio/television program received via the broadcast radio/television network 109 by the infotainment system 201 and the same radio/television program received via the mobile radio data network 110 by the mobile phone 208. The function is performed by means of the cellular phone 208, and operates as follows:
- send a request to the streaming server 102 for sending a data stream (i.e., a multimedia data stream) comprising the radio/television program previously selected by the user on the infotainment system 201 and identified by the mobile phone 208 by means of, for example, the "program identification via hash" functionality;
- extract and/or decode the radio/television program contained in the data stream through the second multimedia reader 211, obtaining a succession of audio samples of the radio/television program;
- calculate the time difference between the instant of sending the request for the sending of the data stream to the streaming server 102, and the instant in which the first audio sample is extracted and decoded from the data stream;
- acquire an environmental sound sample through the microphone 213 integrated in the cellular phone 208 and store the initial acquisition time according to a predetermined time reference system. This environmental sound sample aims to acquire a part of the sound reproduction of the radio/television program reproduced by the infotainment system 201;
- calculate the delay between the environmental sound sample of the radio/television program received from the broadcast radio/television network 109 and the audio samples of the radio/television program extracted from the data stream coming from the mobile radio data network 110.

The "switching management" function has the task of determining which multimedia device is most suitable for reproducing the specific radio/television program selected by the user. For example, when the infotainment system 201 is located in a coverage area of the broadcast radio/television network in which the quality of the first radio/television signal is such as to guarantee a correct reproduction of the specific radio/television program, the switching management function implemented on the mobile phone 208 is configured to not activate any type of switching. In other words, when the infotainment system 208 is able to correctly reproduce the radio/television program received from the broadcast radio/television network 109, the "switching management" function is configured to allow the infotainment system 208 to continue playing the specific radio/television program. On the contrary, when the reproduction of the radio/television program by the infotainment system 201 does not guarantee a predetermined reproduction quality (for example, due to the low quality of the first radio/television signal), the telephone 208 is configured to:
- send a request to the streaming server 102 to receive a data stream from the mobile radio data network 110 containing the same radio/television program selected by the user;
- extract and/or decode the radio/television program from the data stream received from the mobile radio data network 110;
- send the specific radio/television program to the infotainment system 201 via the second communication interface 210.

Consequently, the infotainment system 201 can be configured to interrupt the reproduction of the radio/television program received through the radio/television network 109; furthermore, the infotainment system 201 can be configured to send to the multimedia reproduction means 204 of the infotainment system 201 the radio/television program received and supplied thereto by the telephone 208.

According to one aspect of the present invention, the switching management function can be performed entirely by the cellular phone 208; however, some functionalities can be performed with the support of the switching assistance server 107 (for example, for the identification function of the specific radio/television program). In detail, the switching management function implemented by the cellular phone 208 can comprise the following steps:
- launching the "acquisition of audio signal and hash calculation" and "program identification via hash" functions;
- detecting and processing the quality parameter of the first signal Q (broadcast) of the broadcast radio/television network 109; optionally, detecting the quality parameter of the second signal Q (mobile radio) received from the mobile radio telecommunications network 110;
- if the estimate of the radio/television broadcasting quality parameter is such as to guarantee the correct reproduction of the radio/television program:
  - continue the reproduction of the radio/television program extracted from the first radio/television signal;
  - repeat the step of estimating the quality of the first and, optionally, of the second signal received.
- if the estimate of the quality of the broadcast radio/television signal is not such as to guarantee a correct reproduction of the radio/television program:
  - send a request to the streaming server 102 in order to receive a data stream on the phone 208 containing the radio/television program selected by the user;
  - receive the data stream on the telephone 208 via the mobile radio network 110;
  - extract and/or decode the radio/television program from the second signal received from the mobile radio network 110 by means of the second multimedia reader 211;
  - send the radio/television program via the second communication interface from the cellular phone 208 to the first communication interface 203 of the infotainment system 201 (for example, via a wireless Bluetooth or WiFi network or via USB cable) for a reproduction of the radio/television program by the infotainment system 201.

The "switching management" function may be able to temporally synchronise the reproduction of the radio/television program contained in the first radio/television signal with that contained in the data stream of the second signal of the mobile radio network 110. In this way, the reproduction of the specific radio/television program during the switching between the first signal and the second signal can take place without interruptions, and/or repetitions and cuts of the radio/television program. In particular, through the "estimate of the delay" function, the telephone 208 can anticipate the sending of the request for the data stream to the streaming server 102; furthermore, the telephone 208 can specify in the request to the streaming server 102 the time instant of the radio/television program in which the switching will take place.

Unlike the state of the art "service following" techniques, the present invention can be applied directly and without modifications to an infotainment apparatus 201 of normal construction and without any mobile radio network card. According to one aspect of the present invention, the use of a second multimedia apparatus (for example the cellular phone 208) separated from the first multimedia apparatus (for example an infotainment apparatus 201 installed in a vehicle) is sufficient to guarantee the continuity of the multimedia service implemented through the "service following" mechanism. Therefore, in the present invention the cellular telephone (208) acts as auxiliary equipment, to obtain the reproduction of a specific multimedia content from a mobile communication radio/television apparatus (201), even in conditions of poor reception of the signal carrying said specific multimedia content. A further advantage of the present invention is that of minimising the exchange of information between the first multimedia apparatus and the second multimedia apparatus; in this way, as described in the course of the present description, an infotainment apparatus 201 equipped with the function of switching the sound signal source, i.e., the so-called "hands-free" function, can take advantage of the "service following" functions offered by a mobile phone 208 without the need for any modification to the infotainment system.

Naturally, the principle of the invention remaining the same, the embodiments and details of construction can be widely varied with respect to what has been described and illustrated purely by way of non-limiting example, without thereby departing from the scope of protection of the present invention defined by the appended claims.

The invention claimed is:

1. A system for the reproduction of a specific multimedia content comprising in a first part:
   a first multimedia apparatus installed on a mobile vehicle, said first multimedia apparatus comprising:
   a first receiver adapted to receive a first signal comprising said specific multimedia content, said first signal being emitted by a radio/television network of the broadcast type;
   a first multimedia reader adapted to extract said specific multimedia content from said first signal;
   one or more means for the reproduction of said specific multimedia content;
   a first communication interface with apparatuses outside said first apparatus;
   a first processing unit operatively coupled with said first receiver, with said first multimedia reader, with said one or more means for the reproduction of said specific multimedia content, and with said first communication interface, said processing unit being configured to perform the following steps:

receive said first signal from said broadcast-type radio/television network by means of said first receiver;

extract said specific multimedia content from said first signal by means of said first multimedia reader;

reproduce the specific multimedia content extracted from said first signal through said one or more means for the reproduction of said specific multimedia content;

interrupt the reproduction of said specific multimedia content extracted from the first signal;

reproduce a multimedia content received through the first communication interface with apparatuses outside said first apparatus;

wherein:

said system for the reproduction of a specific multimedia content comprises in a second part a second multimedia apparatus comprised in a mobile phone which in turn comprises:

a second receiver adapted to receive a second signal comprising said specific multimedia content, said second signal being emitted by a cellular telephone network;

a second multimedia reader adapted to extract said specific multimedia content from said second signal;

a second communication interface adapted to transmit said specific multimedia content to said first multimedia apparatuses, said second communication interface being able to be operatively coupled with said first communication interface;

a second processing unit operatively coupled with said second receiver, with said second multimedia reader, and with said second communication interface, said second processing unit being configured to perform the following steps:

acquire one or more samples of said first signal received from said first multimedia apparatus and supplied to said second multimedia apparatus through said first and second communication interface, determine an identifier of said specific multimedia content on the basis of said one or more samples;

determine the value of a quality parameter of said first signal by means of said one or more samples;

if said quality parameter value is less than a predefined value, perform the following additional steps:

receive at least a part of said second signal by means of said second receiver;

extract said specific multimedia content from the second signal by means of the second media player; and, send said specific multimedia content by means of said second communication interface to said first multimedia apparatus for a reproduction of said specific multimedia content by said first multimedia apparatus.

2. The system for the reproduction of a specific multimedia content according to claim 1, wherein said second multimedia apparatus comprises a microphone adapted to acquire at least one environmental sound sample comprising said one or more samples of said first signal.

3. The system for the reproduction of a specific multimedia content according to claim 1, wherein said second communication interface is configured to receive said one or more samples of said first signal from the first communication interface.

4. The system for the reproduction of a specific multimedia content according to claim 1, wherein said first communication interface and said second communication interface comprise a module for short-range wireless communications.

5. The system for the reproduction of a specific multimedia content according to claim 1, wherein said second processing unit is further configured to perform the following steps:

calculate one or more hash values relating to said one or more samples of said first signal;

send said one or more hash values to a remote server by means of said cellular telephone network;

receive an identifier of the specific multimedia content and/or the value of the quality parameter of the first signal from said cellular telephone network.

6. The system for the reproduction of a specific multimedia content according to claim 1, wherein the second processing unit is further configured to perform the following steps:

carry out an estimate of the time lag between the specific multimedia content comprised in the first signal and the specific multimedia content comprised in the second signal synchronise the reproduction of the specific multimedia content extracted from the second signal on the basis of said time lag.

* * * * *